United States Patent

[11] 3,575,213

[72] Inventor Ira H. Schnall
Lake City, Pa.
[21] Appl. No. 765,141
[22] Filed Oct. 4, 1968
[45] Patented Apr. 20, 1971
[73] Assignee Blaw-Knox Company
Pittsburgh, Pa.

[54] CONTROL VALVES WITH BALANCED ACTION
8 Claims, 2 Drawing Figs.
[52] U.S. Cl. ....................................................... 137/630.13,
137/630.15, 137/630.22
[51] Int. Cl. ............................................................ F16k 11/16
[50] Field of Search ............................................. 137/630,
630.15

[56] References Cited
UNITED STATES PATENTS

| | | | |
|---|---|---|---|
| 1,867,195 | 7/1932 | Teller ........................... | 137/630.14 |
| 2,180,188 | 11/1939 | Ashworth ..................... | 137/630.14 |
| 2,275,132 | 3/1942 | Crosthwait ................... | 137/630.13 |
| 2,966,167 | 12/1960 | Jensen .......................... | 137/630.15X |
| 3,213,887 | 10/1965 | Angelery ...................... | 137/630.15 |
| 3,428,090 | 2/1969 | Hose ............................ | 137/630.14 |
| 3,439,711 | 4/1969 | Sherwood .................... | 137/630.15 |

Primary Examiner—Clarence R. Gordon
Attorney—Busser, Smith and Harding

ABSTRACT: A control valve having a balanced action whereby a small valve is operable to provide communication between the downstream side of the main valve member and a balancing chamber on the upstream side of the main valve member to balance the pressures across the main valve member and permit ease of movement thereof.

PATENTED APR 20 1971 3,575,213

INVENTOR
IRA H. SCHNALL

BY
Frank A. Follmer

ATTORNEY

CONTROL VALVES WITH BALANCED ACTION

BACKGROUND OF THE INVENTION

The invention relates generally to the field of balanced valves and more particularly to control valves which provide for a balancing of the pressures across a main valve member so that it can be opened with little effort even though subjected to high differential pressures.

In many applications, such as in supercritical service in modern power plants, there is a need for large valves which will provide tight shutoff over long periods of time and which will open rapidly and modulate flow accurately. These valves are used for boiler start-up and steam dump service and are normally operated by air operators. Since the stem force of the valve increases as the valve must operate under higher pressures, the size of the air operator must be increased commensurately and it is possible that the operator may have a response time beyond allowable limits.

In accordance with prior art practice, the size of the air operator may be reduced by the design of a double seated valve wherein inlet pressure is introduced between seats of almost equal area and outlet pressure acts equally on the two ends of the valve plunger. While this design provides low operator forces, it will not provide tight shutoff. Accordingly, the prior art has proposed various valves for achieving tight shutoff by means of a pilot operated, fully balanced plunger which is held closed and sealed by the contained pressure. These valves have a small pilot valve affixed to a stem connected to the valve operator and the main valve member is free to move axially along this stem connecting the pilot to the operator. The main valve's freedom of axial movement in one direction is limited by the pilot valve seat and usually by a mechanical stop in the other direction. The parts are so arranged that when the valve is closed, the main valve member is held against the seat both by the pressure of the contained fluid and by the seating force exerted by the pilot valve on its seat in the main valve member. When the valve is closed, the pressure balancing chamber is at outlet pressure. As the air operator moves the stem it opens the pilot valve and allows inlet pressure to communicate with the balancing chamber wherein the pressure is rapidly equalized with the valve inlet pressure. Since the balancing chamber area is about equal to the area of the main valve seat, the main valve is now balanced and can be moved readily to control the fluid flow.

The main problem associated with the balanced valves of the prior art is lack of durability because the looseness of the main valve member on the stem causes unacceptable "chattering" and wear.

SUMMARY OF THE INVENTION

In accordance with the invention there is provided a valve of the indicated type which is capable of tight shutoff for extended periods of time and is constructed so that there is no chattering of the main valve on its stem. In addition, the valve in accordance with the invention functions satisfactorily under flow reversal conditions and is capable of rapid opening and subsequent modulation over a large turndown ratio. Furthermore, the valve is designed so that it will not require an excessively large air operator. Briefly stated, the advantages of the invention are achieved by a valve construction which has a certain amount of unbalance designed into it so that the main valve member is forced against the mechanical stop on the stem under all conditions of operation. By this arrangement, chattering is avoided, and although the valve is not fully balanced but is described as being semibalanced, it is possible to use a relatively small valve operator.

In order to achieve the tight shutoff and to isolate the valve packing from the high inlet pressure, the valve is constructed so that the inlet pressure is applied to urge both the main valve member and the small valve member against their valve seats when the valve is in the closed position and the valve packing is arranged so as to be subjected to the lower outlet pressure.

Furthermore, in order to achieve a rapid response, the main valve member is constructed with a minimum of mass thereby enhancing the capability of the valve to respond rapidly to emergency requirements.

DESCRIPTION OF THE PREFERRED EMBODIMENT

Figure 1:
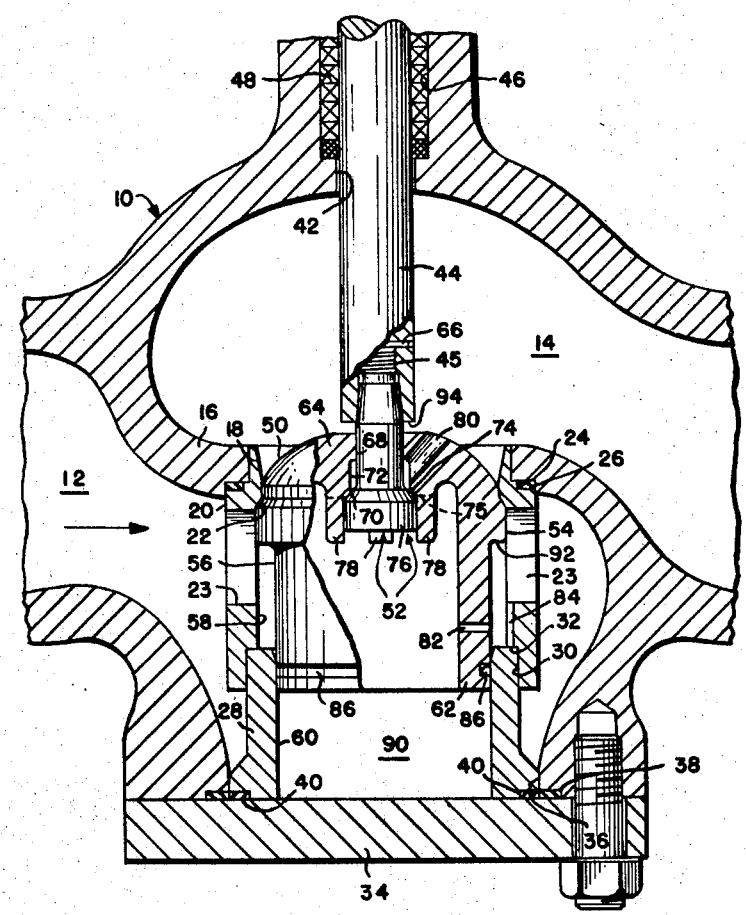
FIG. 1 is a longitudinal sectional view of the valve constructed in accordance with the invention.

The valve in accordance with the invention comprises a valve body 10 having formed therein an inlet chamber 12 and an outlet chamber 14 separated by a partition or web 16. The web 16 has an opening 18 therein adapted to receive, by a tight fit, the upper end of a generally hollow cylindrical valve cage 20. The cage 20 is formed to define a valve seat 22 on its inner wall at a location near its upper end. By this arrangement the valve seat serves to define a passageway between the inlet chamber 12 and the outlet chamber 14. The cage 20 is provided with a plurality of circumferentially arranged ports 23 providing communication between the inlet chamber 12 and the interior of the cage 20.

The opening 18 is counterbored at its lower end to define an annular shoulder 24. The valve cage 20 is shaped to conform to the opening 18 and is provided with an annular seal 26 between the shoulder 24 and the opposed portion of the valve cage to thereby provide the seal between the cage 20 and the web 16.

The lower portion of the cage 20 is supported on the upper end of a hollow cylinder 28, which extends within a bore 30 formed in the lower end of the cage 28 with the upper end of the cylinder 28 contacting a shoulder 32 formed at the end of the bore 30. It will be noted that the parts are arranged so that the cylinder 28, the cage 20, the opening 18 and the valve seat 22 are coaxially positioned.

The cylinder 28 is supported at its lower end on a cover plate 34 bolted to the valve body 10 and arranged to enclose an access opening 36 in the bottom of the valve body 10. Suitable sealing rings 38 and 40 are positioned to provide seals between cover 34 and valve body 10 and between cover 34 and cylinder 28, respectively.

The valve body 10 is provided with a valve stem opening 42 which is coaxially aligned with the valve seat 22 and communicates with the outlet chamber 14. A valve stem 44 extends through the opening 42 and an enlarged portion 46 thereof to the exterior of the valve body 10 for connection to a suitable valve operator means. The enlarged portion of the valve stem opening is filled with the usual packing 48 for the valve stem 44.

The valve stem 44 is arranged to carry a main valve member generally indicated at 50 and a small valve member generally indicated at 52. To this end, the main valve member 50 is guided for movement along the valve axis by external cylindrical walls 54 and 56 which cooperate with the cylindrical internal wall 58 of cage 20 and the cylindrical internal wall 60 of the cylinder 28, respectively. The valve member 50 is hollow in form and comprises a generally cylindrical piston portion 62 enclosed at its upper end by a rounded head portion 64.

The small valve member 52 is supported on the lower end of the valve stem 44 by being received within the valve stem 44 at threads 45. A pin 66 serves to secure the upper end of the valve member 52 in position within the valve stem 44.

The small valve member 52 also serves as a means for connecting the main valve member 50 onto the stem 44. To this end, the small valve member extends downwardly from the valve stem 44 through an opening 68 in the head 64 of the main valve member 50 and into the interior of the main valve member 50 which is provided with a valve seat 70 at the lower end of an enlarged bore 72 below opening 68. The valve member 52 defines an annular surface 74 arranged to seat against the valve seat 70. The valve member 52 is provided with a cylindrical guide portion 76 extending downwardly from the seat 74 and guided for axial movement by four members 78 extending downwardly from an internal wall portion 75 of the head of the valve member at circumferentially spaced locations and providing cylindrical guide surfaces contacting portion 76. Wall portion 75 is located at the upstream end of valve seat 70.

The mounting arrangement for the main valve 50 on the stem 44 is such that a certain amount of relative, axial movement is permitted therebetween and between the valve members 50 and 52. The relative movement in one direction is limited by the contact of seats 70 and 74. The relative movement in the other direction is limited by the contact of an annular shoulder 94 formed on the end of stem 44 and the opposing portion on the head 64 of the main valve member 50.

A passage 80 is provided in the head 64 of the main valve member 50 and serves to provide communication between the outlet side of the main valve member 50 and the bore 72 above the valve seat 70.

A small bleed port 82 is formed in the piston portion 62 of the main valve member 50 and serves to provide restricted flow communication between the interior of the hollow main valve member 50 and the outside thereof subjected to the upstream pressure.

A vertically extending slot 84 is formed in the inner wall 58 of the cage 20 and serves to provide communication between a port 23 and the interior of the cage 20 in the region between the lower end of this port 23 and the upper end of cylinder 28. This is to provide for pressure relief when the shoulder 94 moves below the lower end of the ports 23 when the valve opens.

A sealing ring 86 is provided in the external portion of the piston portion 62 of the main valve 50 and serves to provide a seal between the cooperating piston wall 56 and cylinder wall 60.

In the operation of the valve in accordance with the invention, let it be assumed that the inlet chamber 12 is connected to a high-pressure line and the valve is initially in the closed position, which is shown in FIG. 1. In the closed position of the valve, the high pressure in the inlet chamber 12 acts on the pilot valve 52 to force it against its seat 70 in the main valve member 50. This pressure also acts against the inlet side of the main valve member 50 to force it against its seat 22 formed on the valve cage 20. It will be apparent that with the valve members seated there is little or no stem load required to achieve maximum seat tightness since the force acting to achieve the sealing of the valve is proportional to the pressure of the seal.

It will also be noted that in the closed position of the valve the inlet chamber pressure is communicated through ports 23 in the cage 20 and the small bleed port 82 into the interior of the main valve member 50. The chamber formed within the main valve member 50 and by the interior of the cylinder 28 may be termed a pressure balancing chamber and is indicated generally at 90. Accordingly, the full area of the inlet side of the main valve member 50 is subjected to the upstream pressure in the inlet chamber 12.

When it is desired to position the valve in the open position, a suitable operator connected to the stem 44 causes the stem 44 to move downwardly. During the first part of this downward movement of the stem 44 the small valve 52 is moved off its seat 70 to thereby provide communication between the balancing chamber 90 and the outlet chamber 14 by way of the passage 80. It will be noted that since this flow passage through port 80 and past the open valve 50 is much larger than the flow passage through bleed port 82, the pressure balancing chamber 90 will rapidly achieve pressure equilibrium with the outlet chamber 14. The pressure equalizing flow is shown by arrows in FIG. 2.

It is to be noted that as soon as the valve 52 is opened and before the main valve member 50 is moved away from its valve seat 22, the main valve member 50 is subjected to a slight pressure unbalance across its upstream and downstream sides. While the equilization of pressures between the balancing chamber 90 and the outlet chamber 14 tends to provide balanced pressures in the corresponding region across the valve 50, there is an unbalanced pressure provided in the region of the annular shoulder 92 formed on the inlet side of the main valve member 52. It will be noted that this annular shoulder 92 is subjected to the inlet pressure while the corresponding opposed portion of the valve 50 facing the outlet chamber 14 is subjected to the lower downstream pressure. Thus, there is a slight pressure unbalanced on the main valve member 50 which tends to urge this valve member upwardly toward its seat and toward the valve stem 44. The parts are designed so that the pressure unbalance is sufficient to urge the valve 50 upwardly against either seat 22 or shoulder 94 during valve operation.

As the valve stem 44 continues its downward movement the shoulder 94 formed at its lower end and spaced from the head 64 of the valve member 50 when the small valve member 52 is closed, comes into contact with the opposed portion of the upper surface of the main valve member 50. After this contact further downward movement of the valve stem 44 is transmitted to the main valve member 50 to thereby move the main valve member 50 away from its seat 22 and effect valve opening. The opening of the main valve 50 permits the passage of fluid through the ports 23 and past the flow controlling surface of the head 64 of the valve 50 into the outlet chamber 14.

Figure 2:
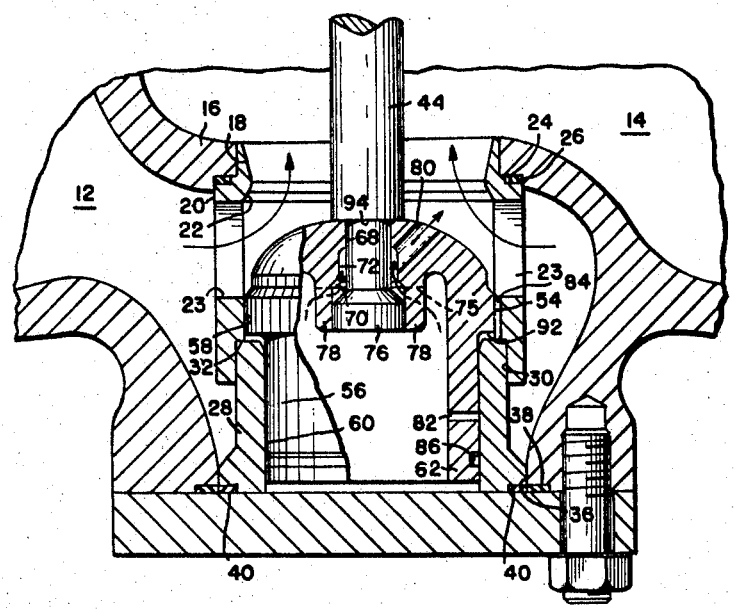
FIG. 2 is a fragmentary view of the valve shown in FIG. 1 with the parts shown in a different flow controlling position.

Let it be assumed that the valve stem operator has been signalled to position the valve in the fully opened position, which is shown in FIG. 2. In this case, as the main valve member 50 moves away from its seat from the position shown in FIG. 1 the bleed hole 82 will be closed by the cylinder 28 after a short amount of travel toward the fully opened position. The closing of the bleed port 82 serves to enhance the speed of response of the balancing chamber 90 to pressure transients which are induced by the movement of the main valve member 50. With the bleed port 82 closed, the balancing chamber 90 will more rapidly achieve a pressure equal to the outlet chamber 14 during valve movement. Otherwise, the flow of fluid from the upstream portion 12 through ports 23 and bleed port 82 will increase the time required for the balancing chamber 90 to respond to a reduction in pressure at the valve outlet 14.

It will also be noted that the valve may be positioned to various throttling positions between the open and closed positions shown and a large turndown ratio is possible. Moreover, during all positions of the valve there is maintained a pressure unbalance across the downstream and upstream sides of the main valve member 50 to thereby urge the same upwardly into contact with the shoulder 94 so as to maintain the valve member 50 in fixed relation relative to the valve stem 44. With the main valve member 50 in contact with the shoulder 94 of the stem, chatter and vibration which might be induced by flow turbulence or rapid stem movement is avoided. This slight pressure unbalanced condition across the main valve member is maintained under all conditions of operation of the valve. One factor contributing to the pressure unbalance is the fact that the annular main valve surface 92 on the upstream side thereof is subjected to higher pressures than the corresponding portion on the downstream side of the main valve member since a pressure differential exists across the seat 22 during all conditions of flow. In addition once the annular stop 94 comes into contact with the upstream side of the main valve 50 the area contacted thereby is no longer subjected to pressure tending to urge the valve 50 away from the stem 44 whereas the corresponding portion on the upstream side of the main valve member 50 is subjected to pressure urging the valve member towards the valve stem 44.

When it is desired to return the open valve to the closed position, the operator for the valve stem 44 causes movement thereof upwardly. Until the valve member 50 comes into the valve seat 22 the upward movement of the valve stem 44 is followed by the valve member 50. However, when the main valve member 50 comes into contact with the valve seat 22 its upward movement is constrained and the valve stem 44 moves upwardly relative to the valve member 50. The unbalanced pressure condition across the annular shoulder 92 will maintain valve member 50 in contact with the valve seat 20 during the relative movement of the valve stem 44 away from the valve member 50. This relative movement serves to move the small valve 52 into contact with its seat 70 to thereby also close the small valve 52.

When the small valve 52 comes into contact with its seat 70 the communication between the balancing chamber 90 and the outlet chamber 14 through port 80 is shut off and the balancing chamber 90 only communicates with the outlet chamber 12 by way of the bleed port 82 and ports 23. Accordingly, the pressure within the balancing chamber is brought into equalibrium with the pressure in the inlet chamber 12. Thus, this relatively high upstream pressure now acts upon the total area of the small valve 52 and the main valve 50 to thereby effect a very tight shutoff as was described above.

In addition to providing a tight seal at the seats 70 and 22, the relatively high inlet pressure also urges the valve cage 20 upwardly to effect a tight seal at the sealing member 24.

Moreover, it is to be noted that the high inlet pressure is isolated from the valve packing 48 which is subjected only to the relatively low outlet pressure in chamber 14.

Moreover, by reason of the hollow construction of the main valve member 50, a minimum of mass is provided whereby rapid response may be achieved.

It will be understood that the above description is illustrative and that changes may be made in the construction and arrangement of parts without departing from the scope of the invention wherefore it is not desired to be limited except as required by the following claims.

I claim:

1. A valve comprising a valve body having an inlet chamber and an outlet chamber defined therein, a partition separating said inlet and outlet chambers, means providing a main valve seat defining a passageway through said partition between said inlet and outlet chambers, means on the inlet side of said partition defining a balancing chamber aligned with said valve seat, a main valve member mounted for movement toward and away from said valve seat between open and closed flow controlling positions, said main valve member having a cylindrical piston portion extending into said balancing chamber and arranged to be guided by the internal wall of said balancing chamber during movement of said valve between said flow controlling positions thereof, the diameter of said piston portion being less than the smallest diameter of said valve seat passageway, said main valve member having an annular surface portion extending radially outwardly of said piston portion to the diameter of said valve seat, said annular surface portion providing an unbalanced pressure responsive condition across said main valve member and being designed so that the unbalanced pressure condition is sufficient to move the main valve member toward said valve seat under all conditions of operation of said valve, a valve stem extending through said valve body, a pressure equalizing passage formed in said main valve member to provide communication between said balancing chamber and said outlet chamber, and a second valve means connected to said valve stem for controlling flow through said pressure equalizing passage, said means for connecting said main valve member on said valve stem including a connecting member extending from said valve stem into the interior of said main valve member for loosely engaging the same to permit relative axial movement between said main valve member and said connecting member, said second valve means including a second valve seat formed on said main valve member to encircle said pressure equalizing passage, said connecting member having a portion arranged to engage said second valve seat for closing flow through said pressure equalizing passage and being movable relative to said main valve member to position said valve seat engaging portion thereof away from said second valve seat for permitting flow through said pressure equalizing passage said main valve member being unbiased toward or away from said second valve means so that only the pressure conditions within the valve act on the main valve member to position it relative to said second valve means, said valve stem having a portion which contacts said main valve member on the upstream side thereof to limit the relative movement between said valve stem and said valve member in one axial direction, the contact between said second valve seat and said valve seat engaging portion of said connecting member limiting the relative movement between said valve stem and said main valve member in the other axial direction.

2. A valve according to claim 1 including a piston ring carried by said piston portion providing a tight seal between the outer wall of said piston portion and the internal wall of said balancing chamber.

3. A valve according to claim 1 wherein said main valve member is hollow in the region of said piston portion.

4. A valve according to claim 1 wherein said valve stem extends into said outlet chamber and including packing means for said valve stem subjected only to the pressure in said outlet chamber when the valve is closed.

5. A valve comprising a valve body having an inlet chamber and an outlet chamber defined therein, a partition separating said inlet and outlet chambers, means providing a main valve seat defining a passageway through said partition between said inlet and outlet chambers, means on the inlet side of said partition defining a balancing chamber aligned with said valve seat, a main valve member mounted for movement toward and away from said valve seat between open and closed flow controlling positions, said main valve member having a cylindrical piston portion extending into said balancing chamber and arranged to be guided by the internal wall of said balancing chamber during movement of said valve between said flow controlling positions thereof, the diameter of said piston portion being less than the smallest diameter of said valve seat passageway, said main valve member having an annular surface portion extending radially outwardly of said piston portion to the diameter of said valve seat, said annular surface portion providing an unbalanced pressure responsive condition across said main valve member and being designed so that the unbalanced pressure condition is sufficient to move the main valve member toward said valve seat under all conditions of operation of said valve, a valve stem extending through said valve body, a pressure equalizing passage formed in said main valve member to provide communication between said balancing chamber and said outlet chamber, and a second valve means connected to said valve stem for controlling flow through said pressure equalizing passage, said means for connecting said main valve member on said valve stem including a connecting member extending from said valve stem into the interior of said main valve member for loosely engaging the same to permit relative axial movement between said main valve member and said connecting member, said second valve means including a second valve seat formed on said main valve member to encircle said pressure equalizing passage, said connecting member having a portion arranged to engage said second valve seat for closing flow through said pressure equalizing passage and being moveable relative to said main valve member to position said valve seat engaging portion thereof away from said second valve seat for permitting flow through said pressure equalizing passage said main valve member being unbiased toward or away from said second valve means so that only the pressure conditions within the valve act on the main valve member to position it relative to said second valve means, a small bleed port providing communication between said inlet chamber and the interior of said main valve member during the closed position of said main valve member whereby said balancing chamber pressure may be equalized with said inlet pressure by way of said bleed port when the valve is closed, said bleed port being arranged to be closed by the internal wall of said balancing chamber after said main valve member has moved a predetermined amount away from said main valve seat to a partially open position.

6. A valve comprising a valve body having an inlet chamber and an outlet chamber defined therein, a partition separating said inlet and outlet chambers, means providing a main valve seat defining a passageway through said partition between said inlet and outlet chambers, means on the inlet side of said partition defining a balancing chamber aligned with said valve seat, a main valve member mounted for movement toward and away from said valve seat between open and closed flow controlling positions, said main valve member having a cylindrical piston portion extending into said balancing chamber and arranged to be guided by the internal wall of said balancing chamber during movement of said valve between said flow controlling positions thereof, the diameter of said piston portion being less than the smallest diameter of said valve seat passageway, said main valve member having an annular surface portion extending radially outwardly of said piston portion to the diameter of said valve seat, said annular surface portion providing an unbalanced pressure responsive condition across said main valve member and being designed so that the unbalanced pressure condition is sufficient to move the main valve member toward said valve seat under all conditions of operation of said valve, a valve stem extending through said valve body, a pressure equalizing passage formed in said main valve member to provide communication between said balancing chamber and said outlet chamber, and a second valve means connected to said valve stem for controlling flow through said pressure equalizing passage, said means for connecting said main valve member on said valve stem includes a connecting member extending from said valve stem into the interior of said main valve member for loosely engaging the same to permit relative axial movement between said main valve member and said connecting member, said second valve means including a second valve seat formed on said main valve member to encircle said pressure equalizing passage, said connecting member having a portion arranged to engage said second valve seat for closing flow through said pressure equalizing passage and being movable relative to said main valve member to position said valve seat engaging portion thereof away from said second valve seat for permitting flow through said pressure equalizing passage, said main valve member being unbiased toward or away from said second valve means so that only the pressure conditions within the valve act on the main valve member to position it relative to said second valve means, and a valve cage mounted in an opening in said partition and extending from said opening into said inlet chamber, said main valve seat being formed on said valve cage, said valve cage being provided with a passageway means providing communication with said inlet chamber.

7. A valve according to claim 6 wherein said valve cage in generally cylindrical, cooperating cylindrical wall portions formed on said cage member and on the exterior of said main valve member providing a guide for said main valve member as it is moved between said flow controlling positions thereof.

8. A valve according to claim 7 including means providing a seal between said valve cage and said partition at a location whereby when the main valve member is urged against its seat on the valve cage, the valve cage is moved to tighten the seal between the valve cage and the partition.